(12) United States Patent
Drebinger et al.

(10) Patent No.: US 8,495,582 B2
(45) Date of Patent: Jul. 23, 2013

(54) METHOD FOR CARRYING OUT ONLINE PROGRAM CHANGES ON AN AUTOMATION SYSTEM

(75) Inventors: Andreas Drebinger, Herzogenaurach (DE); Jürgen Schindler, Erlangen (DE); Jochen Zingraf, Obermichelbach (DE)

(73) Assignee: Siemens Aktiengesellschaft, München (DE)

( * ) Notice: Subject to any disclaimer, the term of this patent is extended or adjusted under 35 U.S.C. 154(b) by 863 days.

(21) Appl. No.: 12/312,053

(22) PCT Filed: Oct. 9, 2007

(86) PCT No.: PCT/EP2007/060712
§ 371 (c)(1),
(2), (4) Date: Apr. 23, 2009

(87) PCT Pub. No.: WO2008/049727
PCT Pub. Date: May 2, 2008

(65) Prior Publication Data
US 2010/0063605 A1    Mar. 11, 2010

(30) Foreign Application Priority Data

Oct. 26, 2006    (EP) .................................... 06022427

(51) Int. Cl.
*G06F 9/44*    (2006.01)
(52) U.S. Cl.
USPC .............................. 717/127; 717/131; 700/87
(58) Field of Classification Search
USPC ................ 717/101–178; 700/18, 85–87, 197, 700/181, 113; 701/115; 726/6; 379/112.1, 379/112.04, 133; 718/103; 705/7.28, 7.29, 705/7.31; 709/201, 203, 217, 232; 902/13, 902/6
See application file for complete search history.

(56) References Cited

U.S. PATENT DOCUMENTS

| | | | |
|---|---|---|---|
| 5,440,741 A * | 8/1995 | Morales et al. ................ 718/103 |
| 5,485,620 A * | 1/1996 | Sadre et al. .................... 717/162 |
| 5,802,308 A * | 9/1998 | Itoh et al. ...................... 709/232 |
| 5,892,818 A * | 4/1999 | Lee ............................ 379/112.1 |
| 5,970,243 A | 10/1999 | Klein et al. |
| 6,141,683 A | 10/2000 | Kraml et al. |
| 6,519,765 B1 * | 2/2003 | Kawahito et al. ............. 717/127 |
| 6,820,024 B2 * | 11/2004 | Fukumoto ....................... 702/85 |
| 7,065,415 B2 * | 6/2006 | Kay et al. ........................ 700/87 |
| 7,441,152 B2 | 10/2008 | Kato |
| 7,454,457 B1 * | 11/2008 | Lowery et al. ................ 709/203 |
| 2003/0171826 A1 * | 9/2003 | Lee ................................... 700/2 |
| 2004/0163079 A1 * | 8/2004 | Noy et al. ...................... 717/154 |
| 2004/0172730 A1 * | 9/2004 | Washington et al. ............. 902/6 |

(Continued)

FOREIGN PATENT DOCUMENTS

| EP | 1 300 874 A1 | 4/2003 |
|---|---|---|
| EP | 1 705 566 A1 | 9/2006 |

(Continued)

*Primary Examiner* — Jason Mitchell
*Assistant Examiner* — Francisco Aponte

(57) ABSTRACT

A method for performing online program changes on an automation system is provided. New program parts are loaded into a CPU of the automation system, while a user program is currently running, in order to provide a new user program. In order to avoid overloading of the CPU, switching is made to the new user program only after it is determined, by monitoring of the first processing of all the program cycles, that the CPU has not been overloaded.

7 Claims, 2 Drawing Sheets

U.S. PATENT DOCUMENTS

| | | | |
|---|---|---|---|
| 2005/0021156 A1* | 1/2005 | Kay et al. | 700/18 |
| 2006/0190106 A1* | 8/2006 | Kay et al. | 700/86 |
| 2006/0206887 A1* | 9/2006 | Dodge et al. | 717/161 |
| 2006/0212161 A1* | 9/2006 | Bhat et al. | 700/197 |
| 2006/0218545 A1 | 9/2006 | Taguchi | |
| 2007/0061783 A1* | 3/2007 | Prakash | 717/127 |
| 2008/0027769 A1* | 1/2008 | Eder | 705/7 |

FOREIGN PATENT DOCUMENTS

| | | |
|---|---|---|
| JP | 9128255 A | 5/1997 |
| JP | 2000132207 A | 5/2000 |
| JP | 2001242913 A | 9/2001 |
| JP | 2002041328 A | 2/2002 |
| JP | 2002127848 A | 5/2002 |
| JP | 2003122574 A | 4/2003 |
| JP | 2005346331 A | 12/2005 |
| JP | 2006268172 A | 10/2006 |
| SU | 387367 A1 | 6/1973 |

* cited by examiner

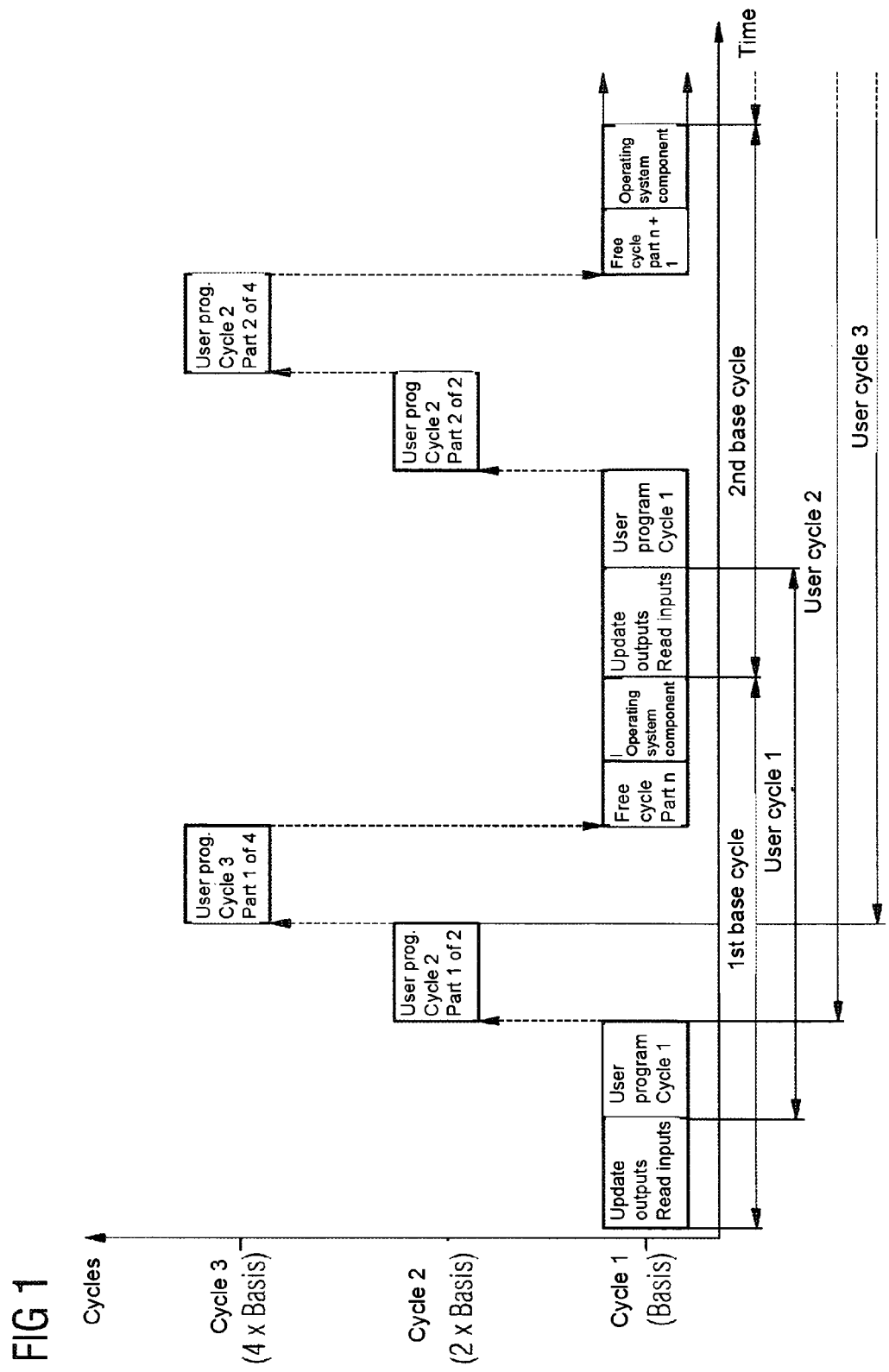

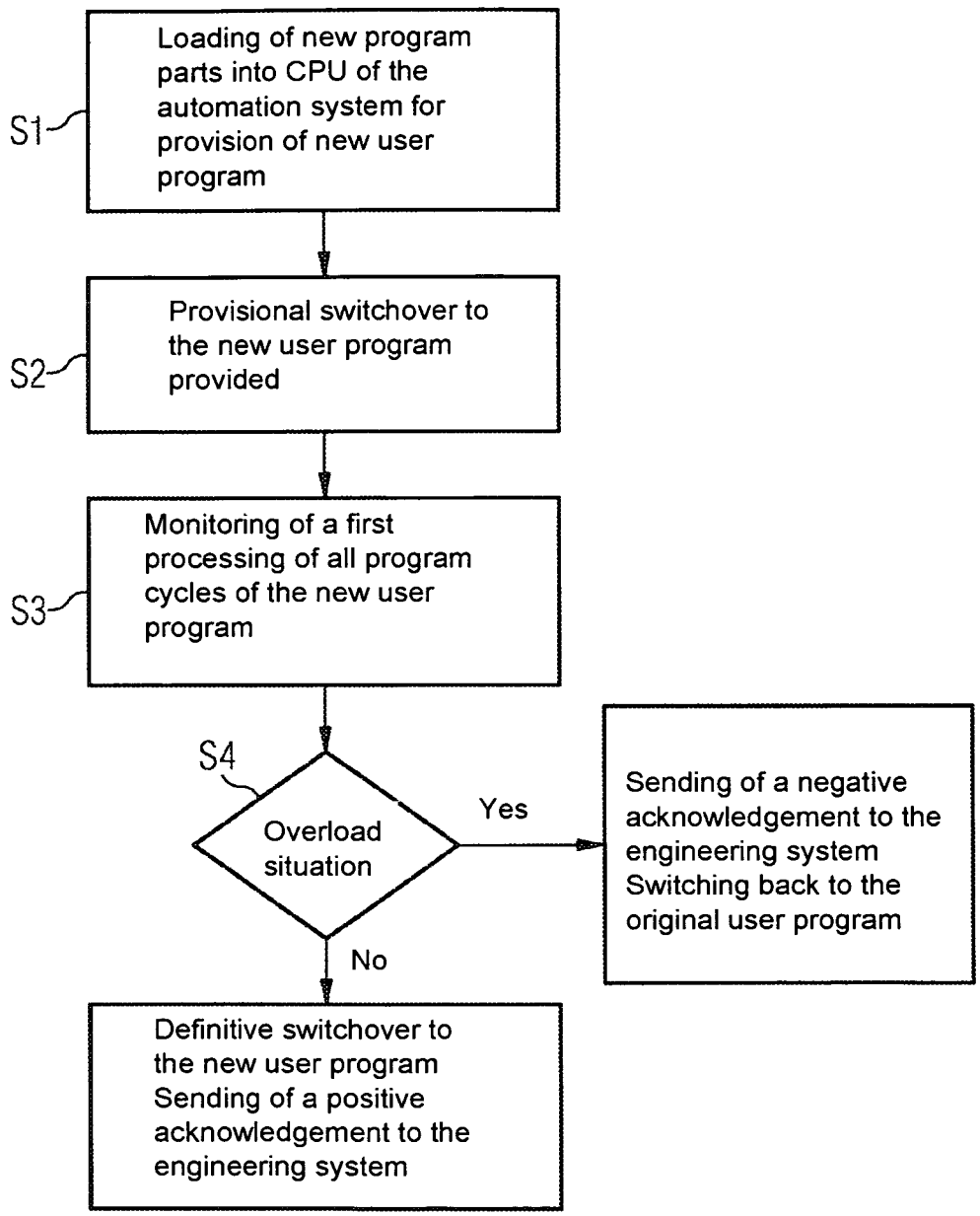

METHOD FOR CARRYING OUT ONLINE PROGRAM CHANGES ON AN AUTOMATION SYSTEM

CROSS REFERENCE TO RELATED APPLICATIONS

This application is the US National Stage of International Application No. PCT/EP2007/060712, filed Oct. 9, 2007 and claims the benefit thereof. The International Application claims the benefits of European Patent Office application No. 06022427.6 EP filed Oct. 26, 2006, both of the applications are incorporated by reference herein in their entirety.

FIELD OF INVENTION

The invention relates to a method for performing online program changes on an automation system.

BACKGROUND OF INVENTION

A process technology plant, which for example is utilized in power plants, is generally automated from a network of many control and regulation systems. These systems are assigned to individual plant areas. Despite this structuring into individual automation areas, it is never possible to prevent mutual influence. The failure of an individual automation system can result in failure of the entire plant.

As well as the failures caused by hardware faults, which, for example, can largely be prevented by appropriate redundancy, online program changes can likewise bring about the overloading of automation systems.

SUMMARY OF INVENTION

Online program changes are in particular necessary in the course of the commissioning or plant extension during ongoing operation. The risk of CPU-overload affecting an automation system is here to be minimized, and optimum utilization of the CPU resources ensured at the same time.

An automation system generally operates in a cycle-based mode. This means that the user program is executed in a distributed fashion across cycles of different speeds. If the execution time of the individual program parts now exceeds the cycle time concerned, a CPU-overload results. The effects range from flawed control behavior or realtime behavior to shutdown of the entire automation system.

Until now generally only the static capacity of a CPU has been checked before or during loading. This means that the storage requirements for the new program parts were compared with the storage space still available in the CPU. Further measures are, however, necessary for checking of the dynamic capacity. Further, the CPU usage level can be calculated offline. To this end, all individual functions of a user program are added up, taking account of their execution cycle. Values such as the system and communication load must furthermore be factored in too. Major inaccuracies can arise here, for which reason greater reserves must be planned in, with the associated lower CPU utilization level. Furthermore, manual calculation is highly time-intensive and error-prone. In order to avoid this, a calculation solution must additionally be developed and maintained. It is thus, for example, necessary to determine the typical runtime of new or modified user functions, and to feed these into the calculation tool.

Neither is it possible to calculate the system and communication load of an automation system with sufficient precision, as these values depend on many parameters which are generally invisible to the user. Typical influencing factors include:

Updating of the process image of the inputs and outputs,
Cyclical alarm processing,
Communication functions, and
Operating system processing.

If all preventive checks, if present, proceed positively, the new program parts are then loaded into the running CPU, and executed. It is here never possible to rule out CPU overloads arising as a result of excessive user program loading. This then leads to cycle time overruns, which although reported, generally leave the user with insufficient time to reverse the last change. In many situations, repeated exceeding of the cycle time results in the entire automation system entering the stop status.

The object of the invention is to specify a method for performing online program changes on an automation system, with which CPU-overload-initiated flawed control behavior or realtime behavior, which in the worst case can lead to shutdown of the entire automation system, can be prevented.

According to the invention, the object is achieved with the method cited at the outset for performing online program changes on an automation system, in which an online program change is performed by new program parts being loaded into a CPU of the automation system, into which a currently running user program is loaded, in order to provide a new user program, and in which, in order to prevent CPU overload, switchover to the new user program only takes place when no CPU overload has been recognized after monitoring of a first execution of all program cycles of the new user program.

By means of the inventive method, an online program change can be realized in such a way that a possible overload situation does not occur in the first place. By means of the inventively provided monitoring of a first execution of all program cycles of the new user program, immediately following a first, provisional switchover to the new user program, a possible CPU overload is recognized and a switch back to the original program version carried out, so that no user reaction is required. The monitoring is here preferably performed by the operating system of the automation device, where the monitoring period is preferably determined by the slowest cycle or the cycle with the lowest priority.

Seen as a whole, stability in the case of online program changes can be significantly increased by means of the inventive method. The CPU resources can furthermore be optimally utilized.

In one practical embodiment of the inventive method, which is particularly advantageous in the case of systems in which the automation system communicates with an engineering system, which as a rule enables user process guidance in relation to the processes of the automation system to be controlled/regulated via a graphical interface, upon recognition of CPU overload, a negative acknowledgment is sent to the engineering system, in order to signal a switch back to the original user program. According to the invention the automation system thus switches back to the original user program upon recognition of CPU overload, and signals this fact to the engineering system with a negative acknowledgment. According to the invention, in this way a switch back to the previous program version can be performed in a coordinated manner. The entire online change procedure is thus interpreted as being unsuccessful, and this fact communicated to the user preferably in a suitable response. According to the invention it is here preferably to be ensured that the monitoring function itself functions properly in the case of an overload, which can, for example, be realized by assigning the monitoring function a sufficiently high priority.

In the event of no CPU overload being recognized, the automation system sends a positive acknowledgment to the engineering system communicating with the automation system, in order to signal a definitive switchover to the new user program, and thus successfully to complete the online change procedure.

BRIEF DESCRIPTION OF THE DRAWINGS

The inventive method is explained below on the basis of diagrammatic representations, where FIG. 1 shows a diagrammatic representation of the working of an automation system, and FIG. 2 shows a diagrammatic representation of the inventive method in the form of a flowchart.

DETAILED DESCRIPTION OF INVENTION

FIG. 1 shows in diagrammatic form the working of an automation system in the form of a cyclically operating control or regulation system. It is based on a basic cycle with the following sections within a fixed time slot:

Update outputs/read inputs,
User program in cycle 1,
User program part in cycle 2,
User program part in cycle 3,
. . . ,
User program part in cycle n,
Free cycle, and
Operating system element.

The user program in cycle 1 executes completely every time. The user programs in the higher cycles are divided into a number of parts, if possible of the same size, of which one in each case is processed per basic cycle. The user program in cycle 2 thus comprises 2 parts, that in cycle 3 of 4 parts and so on. An overload situation can now arise if the sum of the runtimes of all components of a basic cycle is greater than the cycle time set.

Part of the remaining time still available after processing of the user program in all fixed cycles, is used for the free cycle processed at a lower priority. This cycle too is subject to time monitoring and must likewise be included in the overload monitoring in the case of online changes.

A further part of the remaining time comprises a part of the operating system for communication with the operating system.

There follows an explanation of the inventive method based on the flowchart shown in FIG. 2.

If within the framework of an online change, new program parts are loaded into the CPU of the automation system via an engineering system which communicates with the automation system, (cf. Step S1 in FIG. 2), a provisional switchover to the new user program provided by the loading of new program parts (cf. Step S2 in FIG. 2) is first performed. According to the invention, the automation system is embodied to load the new program parts alongside a user program which is still currently running, and to prepare for execution of the program parts, but not yet to execute them. The provisional switchover serves to carry out monitoring (cf. Step S3 in FIG. 2) of a first execution of all program cycles of the new user program. The new user program is active here, with the first cycle in each case preferably also being monitored. Furthermore, the monitoring period is here preferably determined by the slowest cycle or the cycle with the lowest priority. If no time overrun of the operating system of the automation system is recognized within the monitoring period, a positive acknowledgment can then be sent to the engineering system, in order to signal a switchover, which has already been definitively performed, to the new user program. Upon recognition of an overload situation, on the other hand, the automation system initially switches back to the original user program and then transmits a negative acknowledgment to the engineering system, in order to signal to the latter a switch back to the original user program (cf. Step S4 in FIG. 2).

The inventive method can be realized by programming means, preferably in the programming language STEP7, and integrated into a Type SPPA-T3000 V2.0 control system, where a Type SIMATIC S7 platform is employed as the automation platform.

The invention claimed is:

1. A method for performing a plurality of online program changes on an automation system, comprising:
    operating the automaton system in a cycle-based mode having a fixed cycle time per base cycle and having a plurality of additional enumerated cycles having cycle times which are multiples of the base cycle time, wherein programs are executed in a distributed fashion across enumerated cycles having different speeds by dividing the programs into a number of program parts, assigning the program parts to an assigned enumerated cycle based on an execution speed priority, and processing the program parts during an assigned enumerated cycle in order to provide for different program execution speeds based on the assigned enumerated cycle;
    executing a current user program in cycle-based mode on a CPU of the automation system;
    loading a plurality of new program parts into the CPU in order to provide a modified user program;
    running a first execution of all program cycles of the modified user program;
    monitoring over a monitoring period the first execution of all program cycles of the second user program, wherein the monitoring period comprises the enumerated cycle having the slowest program execution speed; and
    determining either a CPU overload situation when a sum of runtimes of all program parts in a base cycle exceeds the fixed cycle time based on the monitoring, wherein a switch back to the previous user program occurs, or a no overload situation, wherein the execution of the modified program will be continued.

2. The method as claimed in claim 1, wherein when the CPU overload situation is determined, a negative acknowledgment is sent by the automation system to an engineering system with which the automation system communicates, in order to signal a switch back to the first user program.

3. The method as claimed in claim 1, wherein when the CPU overload situation is not determined, a positive acknowledgment is sent by the automation system to the engineering system with which the automation system communicates, in order to signal a switchover to the new user program.

4. The method as claimed in claim 1, wherein a provisional switchover is defined as a time period when the second user program is being loaded and during which the automation system prepares for an execution of the plurality of new program parts and performs the monitoring of a first execution of all of the plurality of program cycles of the second user program.

5. The method as claimed in claim 1, wherein the method is realized by a STEP7™ programming language.

6. The method as claimed in claim 5, wherein the method is integrated into a Type SPPA-T3000 V2.0™ control system, where a Type SIMATIC S7™ platform is employed as the automation system.

7. A method for performing a plurality of online program changes on an automation system, comprising:

operating the automation system in a cycle-based mode having a fixed cycle time per base cycle and having a plurality of additional enumerated cycles having cycle times which are multiples of the base cycle time, wherein programs are executed in a distributed fashion across enumerated cycles having different speeds by dividing the programs into a number of program parts, assigning the program parts to an assigned enumerated cycle based on an execution speed priority, and processing the program parts during the assigned enumerated cycle in order to provide for different program execution speeds based on the assigned enumerated cycle;

loading a plurality of new program parts into a CPU of the automation system while a current user program is currently executing on the CPU in cycle-based mode in order to provide a new user program;

provisionally switching over to the new user program by running a first execution of all program cycles of the new user program;

monitoring over a monitoring period the first execution of all program cycles of the new user program, wherein the monitoring period is determined by a slowest cycle that coincides with the cycle time of the enumerated cycle having the slowest program execution speed;

determining a CPU overload situation when a sum of runtimes of all program parts in a base cycle exceeds the fixed cycle time based on the monitoring;

wherein if an overload situation is determined, switching back to the current user program and signaling the switching back; and wherein if no overload situation is determined, definitively switching over to the new user program and signaling the definitive switching over.

* * * * *